United States Patent
Worrall et al.

(10) Patent No.: US 10,111,203 B2
(45) Date of Patent: Oct. 23, 2018

(54) WIRELESS COMMUNICATION SYSTEM, METHOD, USER EQUIPMENT, NODE AND COMPUTER PROGRAM PRODUCT

(71) Applicant: Alcatel Lucent, Boulogne Billancourt (FR)

(72) Inventors: Chandrika K. Worrall, Swindon (GB); Sudeep K. Palat, Swindon (GB)

(73) Assignee: ALCATEL LUCENT, Boulogne Billancourt (FR)

( * ) Notice: Subject to any disclaimer, the term of this patent is extended or adjusted under 35 U.S.C. 154(b) by 242 days.

(21) Appl. No.: 15/033,243

(22) PCT Filed: Oct. 24, 2014

(86) PCT No.: PCT/EP2014/002871
§ 371 (c)(1),
(2) Date: Apr. 29, 2016

(87) PCT Pub. No.: WO2015/062712
PCT Pub. Date: May 7, 2015

(65) Prior Publication Data
US 2016/0249325 A1 Aug. 25, 2016

(30) Foreign Application Priority Data
Nov. 1, 2013 (EP) .................................. 13290267

(51) Int. Cl.
*H04W 72/00* (2009.01)
*H04W 72/04* (2009.01)
*H04W 4/06* (2009.01)

(52) U.S. Cl.
CPC ........... *H04W 72/005* (2013.01); *H04W 4/06* (2013.01); *H04W 72/0446* (2013.01)

(58) Field of Classification Search
CPC .. H04W 72/005; H04W 4/06; H04W 72/0446
See application file for complete search history.

(56) References Cited

U.S. PATENT DOCUMENTS

2010/0272004 A1* 10/2010 Maeda .................. H04L 5/0007
370/312
2012/0314642 A1* 12/2012 Xu ........................ H04W 48/16
370/312

FOREIGN PATENT DOCUMENTS

CN          101552950         10/2009
EP          2 512 160 A1      10/2012
(Continued)

OTHER PUBLICATIONS

LG Electronics Inc., Contents of MBMS reception status[online], 3GPP TSG-RAN WG2#71, 3GPP, Aug. 28, 2010, R2-104459, searched [Apr. 18, 2017], Internet<URL:http://www.3gpp.org/ftp/tsg_ran/WG2_RL2/TSGR2_71/Docs/R2-104559.zip>.

(Continued)

*Primary Examiner* — Melvin Marcelo
(74) *Attorney, Agent, or Firm* — Fay Sharpe LLP

(57) ABSTRACT

A method, performed in a wireless telecommunication system providing communication services to multiple user equipment (UE) devices across multiple cells of the system and supporting broadcast information services in one or more multimedia-broadcast multicast-service single frequency network (MBSFN) areas of the system, comprising providing a first point-to-multipoint multicast control channel (MCCH) and at least one additional MCCH channel per MBSFN area.

13 Claims, 5 Drawing Sheets

(56) References Cited

FOREIGN PATENT DOCUMENTS

| | | |
|---|---|---|
| JP | 2011-61831 | 3/2011 |
| WO | 2011079646 A | 7/2011 |
| WO | 2011097855 | 8/2011 |

OTHER PUBLICATIONS

Ericsson, ST-Ericsson, MBMS notification and UE energy consumption in LTE Rel-9[online], 3GPP TSG-RAN WG2#66bis, 3GPP, Jul. 3, 2009, R2-093799, searched [Apr. 18, 2017], Internet <URL:http://www.3gpp.org/ftp/tsg_ran/WG2_RL2/TSGR2_66bis/Docs/R2-093799.zip>.
LG Electronics Inc., "E-mail discussion on multiple MBSFN support (67#31)," $3^{rd}$ Generation Partnership Project (3GPP), R2-095906, pp. 1-9, XP050604723, Miyazaki, Japan, Oct. 12-16, 2009.
International Search Report for PCT/EP2014/002871 dated Nov. 27, 2014.

\* cited by examiner

Subframe allocated for scheduling of MTCHs belong to MCCH2

Subframe allocated for scheduling of MTCHs belong to MCCH1

Subframe allocated for unicast transmission

Subframe allocated for MCCH transmission

WIRELESS COMMUNICATION SYSTEM, METHOD, USER EQUIPMENT, NODE AND COMPUTER PROGRAM PRODUCT

TECHNICAL FIELD

The present invention relates to wireless communications, and more particularly although not exclusively, to transmission and reception of messages relating to a multimedia broadcast/multicast service (MBMS).

BACKGROUND

In a wireless telecommunications system, services for broadcast or multicast of messages and data to user equipment (UE) can be provided. Such services, referred to as multimedia broadcast multicast services (MBMS), can be transmitted throughout a single cell or throughout several contiguous or overlapping cells of the system, with a set of cells receiving an MBMS referred to as a service area.

Typically, transmission for an MBMS occurs over two channels: a multicast control channel (MCCH) and a multicast traffic channel (MTCH). The MTCH delivers content of the MBMS, and the MCCH delivers control information related to the MBMS. The MCCH might include key control information that specifies how the content in the MTCH is to be delivered for example, and MCCH channels are used as point-to-multipoint downlink channels to transmit MCCH information. In general, one cell has one corresponding MCCH.

In the Long Term Evolution (LTE) architecture, an enhanced version of MBMS (eMBMS), referred to as Multicast-Broadcast Single-Frequency Network (MBSFN), supports broadcast only services. A plurality of MBSFN areas can be defined, each having an MCCH channel to transmit MCCH information to all UEs in the MBSFN area in question.

MBMS information on the MCCH channel is transmitted according to a fixed schedule, which is common for all services. Thus, the majority of MCCH information is transmitted periodically based on a repetition period. This MCCH information is repeated a configurable number of times with exactly the same content. The time period in which the content of this MCCH information remains unchanged is called the 'modification period'.

SUMMARY OF THE INVENTION

According to an example, there is provided a method, performed in a wireless telecommunication system providing communication services to multiple user equipment (UE) devices across multiple cells of the system and supporting broadcast information services in one or more multimedia-broadcast multicast-service single frequency network (MBSFN) areas of the system, comprising providing a first point-to-multipoint multicast control channel (MCCH) and at least one additional MCCH channel per MBSFN area. For an MBSFN area, a periodicity for the at least one additional MCCH can be selected that is different to the periodicity of the first MCCH of the MBSFN area. The modification period of the at least one additional MCCH in an MBSFN area can be configured to a lower value than the modification period of the first MCCH channel for the area. The at least one additional MCCH channel can be configured independently of the first MCCH channel for an area. Multiple multicast traffic channels (MTCHs) belonging to different MCCHs can be transmitted in the same physical multicast channel (PMCH) in a transmission time interval (TTI). Radio resource can be partitioned at the subframe level for the scheduling of MTCHs belonging to different MCCHs.

According to an example, there is provided a method for supporting point-to-multipoint multicast communication with multiple UE devices in a wireless telecommunication system, the method comprising providing a first multicast control channel (MCCH) for use with the multiple UEs with a first modification period, providing a second MCCH for use with at least a subset of the multiple UEs. The second MCCH can have a second modification period that is smaller than the first modification period. The first MCCH can be an unmodified control channel for the system. The first MCCH can be used in connection with transmission of a first type of service, and the at least one additional MCCH is used in connection with transmission for a public safety service.

According to an example, there is provided user equipment configured to monitor a first multicast control channel (MCCH) of a wireless telecommunications system periodically according to a first period, and to monitor a second MCCH of the system periodically according to a second period.

According to an example, there is provided a wireless telecommunication system operable to provide communication services to multiple user equipment (UE) devices across multiple cells of the system and to support broadcast information services in one or more multimedia-broadcast multicast-service single frequency network (MBSFN) areas of the system, the system including a node operable to communicate with user equipment using a first point-to-multipoint multicast control channel (MCCH) and at least one additional MCCH channel per MBSFN area.

According to an example, there is provided a node in a wireless telecommunication system operable to provide communication services to multiple user equipment (UE) devices across multiple cells of the system and to support broadcast information services in one or more multimedia-broadcast multicast-service single frequency network (MBSFN) areas of the system, the node operable to communicate with user equipment using a first point-to-multipoint multicast control channel (MCCH) and at least one additional MCCH channel per MBSFN area. The node can be operable to configure a periodicity for the at least one additional MCCH that is different to the periodicity of the first MCCH of the MBSFN area.

According to an example, there is provided a computer program product, comprising a computer usable medium having computer readable program code embodied therein, said computer readable program code adapted to be executed to implement a method, in a wireless telecommunication system, as provided above.

BRIEF DESCRIPTION OF THE DRAWINGS

Embodiments will now be described, by way of example only, with reference to the accompanying drawings, in which.

DESCRIPTION

Figure 1:
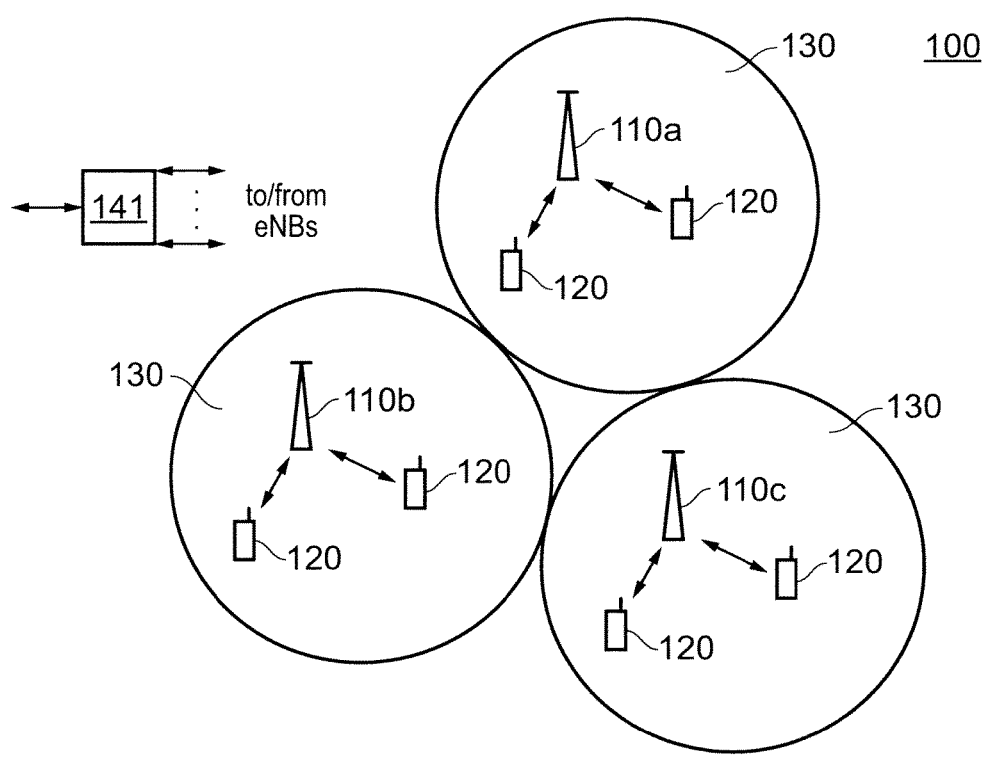
FIG. 1 is a schematic representation of a wireless telecommunication system according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

FIG. 1 is a schematic representation of a wireless telecommunication system 100, which may be an LTE network or some other wireless network, according to an example. Wireless network 100 may include a number of evolved Node Bs (eNBs) 110 and other network entities. For simplicity, only three eNBs 110a, 110b and 110c and one network controller 141 are shown in FIG. 1. An eNB communicates with UEs 120. Each eNB 110 provides communication coverage for a particular geographic area (cell) 130 and supports communication for the UEs located within the coverage area of the cell. While such cells 130 are depicted as having non-overlapping coverage areas, persons of ordinary skill in the art will recognize that one or more of the cells 130 may have partially overlapping coverage with adjacent cells.

UEs 120 may be dispersed throughout the system 100, and UEs can be stationary or mobile. A UE communicates with an eNB via the downlink and uplink. The downlink refers to the communication link from the eNB to the UE, and the uplink refers to the communication link from the UE to the eNB. Bi-directional communication between an eNB and a UE is depicted in FIG. 1 by a solid line with double arrows.

Wireless network 100 may support MBMS services for multiple UEs as well as unicast services for individual UEs. An MBMS service may be a broadcast service or a multicast service. MBMS services may be supported with a multi-cell mode, a single-cell mode, and/or other modes. In the multi-cell mode, multiple cells may simultaneously send a MBMS transmission using multimedia broadcast single frequency network (MBSFN), which may allow a UE to combine the signals received from the multiple cells in order to improve reception performance for example. In the single-cell mode, a cell may send a MBSFN transmission by itself.

In LTE for example, data and overhead information are processed as logical channels at a Radio Link Control (RLC) layer. The logical channels are mapped to transport channels at a Medium Access Control (MAC) layer. The transport channels are mapped to physical channels at a physical layer (PHY). A broadcast control channel (BCCH) can carry system information blocks (SIBs), with each SIB including certain system information pertinent for communicating with and/or receiving data from a cell. The MCCH may carry control information used to receive MBMS services, such as a list of MBMS services with ongoing sessions, information used to receive the MTCH, and so on. The MTCH may carry data for MBMS services.

From a public safety perspective, group communication in a radio telecommunications system 100 is an important consideration. The enhanced MBMS (eMBMS) procedure can provide a suitable approach for the support of group communication from radio resource efficiency perspectives, since group communication typically requires the transmission of the same information to a large number of receiving group members. Particularly from a public safety point of view, group communication has certain latency requirements that may need to be satisfied in order to make it viable. One such requirement is on the end-to-end setup delay. Typically, this should satisfy 300 ms. However an eMBMS procedure uses the multicast control channel (MCCH) to inform the bearer configuration of new media. The MCCH can only be modified at an MCCH modification boundary, which is set to 5.12 s or 10.2 sec. A 5-10 s delay cannot be tolerable in respect of group communication in emergency public safety communications scenarios.

According to an example, in order to avoid any impacts on legacy UEs who are using eMBMS for other applications, such as mobile TV for example, multiple MCCHs can be provided, with at least one of the multiple channels being defined with a relatively small MCCH modification period for use in group communication for applications such as public safety. For example, the modification period can be defined to be as small as 10 ms.

Multicast-broadcast single-frequency network (MBSFN) is a transmission mode which exploits LTE's OFDM radio interface to send multicast or broadcast data as a multi-cell transmission over a synchronized single-frequency network (SFN). An MBSFN transmission appears to a UE 120 as a transmission from a single large cell. Typically, only one MCCH can be configured per MBSFN area. According to an example however, more than one MCCH is configured for an MBSFN area.

The first MCCH configuration is unmodified from the legacy system. Second, third and so on MCCHs are configured independently from the first MCCH. Also the configuration is performed such that the physical resources associated with first and second MCCH do not collide. Additionally, an MCCH change notification is used unmodified for the first MCCH change. The second, third and so on MCCHs are not considered within the MCCH change notification. A UE supporting group communication for public safety monitors the MCCH in a periodic manner to acquire the MCCH changes.

MCCH is defined per MBSFN area and a maximum of 8 MBSFN areas can be supported in a cell of a telecommunications system. System Information Blocks (SIBs) comprise system information data that is transmitted to a UE from the access network of a system. The information element SIB 13 provides the information required for decoding of the MCCH and for acquiring the MBMS control information associated with one or more MBSFN areas, and is structured as follows:

```
-- ASN1START
SystemInformationBlockType13-r9 ::= SEQUENCE {
    mbsfn-AreaInfoList-r9      MBSFN-AreaInfoList-r9,
    notificationConfig-r9      MBMS-NotificationConfig-r9,
    lateNonCriticalExtension   OCTET STRING    OPTIONAL, -- Need OP
    ...
}
-- ASN1STOP
```

"MBSFN-AreaInfoList" carries the information on MCCH configuration per MBSFN area, and thus contains the information required to acquire the MBMS control information associated with one or more MBSFN areas. A typical signalling format is as follows:

```
-- ASN1START
MBSFN-AreaInfoList-r9 ::=      SEQUENCE (SIZE(1..maxMBSFN-Area)) OF MBSFN-AreaInfo-r9
MBSFN-AreaInfo-r9 ::=          SEQUENCE {
    mbsfn-AreaId-r9                INTEGER (0..255),
    non-MBSFNregionLength          ENUMERATED {s1, s2},
    notificationIndicator-r9       INTEGER (0..7),
    mcch-Config-r9                 SEQUENCE {
        mcch-RepetitionPeriod-r9       ENUMERATED {rf32, rf64, rf128, rf256},
        mcch-Offset-r9                 INTEGER (0..10),
        mcch-ModificationPeriod-r9     ENUMERATED {rf512, rf1024},
        sf-AllocInfo-r9                BIT STRING (SIZE(6)),
        signallingMCS-r9               ENUMERATED {n2, n7, n13, n19}
    },
    ...
}
-- ASN1STOP
```

According to an example, multiple MCCHs are provided per MBSFN area. The second, third and so on MCCH configurations can be signalled in MBSFN-AreaInfoList IE following the legacy signalling structure. The modification (bold) to introduce a second MCCH is as follows:

```
-- ASN1START
MBSFN-AreaInfoList-r9 ::=      SEQUENCE (SIZE(1..maxMBSFN-Area)) OF MBSFN-AreaInfo-r9
MBSFN-AreaInfo-r9 ::=          SEQUENCE {
    mbsfn-AreaId-r9                INTEGER (0..255),
    non-MBSFNregionLength          ENUMERATED {s1, s2},
    notificationIndicator-r9       INTEGER (0..7),
    mcch-Config-r9                 SEQUENCE {
        mcch-RepetitionPeriod-r9       ENUMERATED {rf32, rf64, rf128, rf256},
        mcch-Offset-r9                 INTEGER (0..10),
        mcch-ModificationPeriod-r9     ENUMERATED {rf512, rf1024},
        sf-AllocInfo-r9                BIT STRING (SIZE(6)),
        signallingMCS-r9               ENUMERATED {n2, n7, n13, n19}
    },
    ...
    [[
    mcch2-Config                   SEQUENCE {
        mcch2-RepetitionPeriod         ENUMERATED {rf0, rf1, rf2, rf4, rf8, rf16, rf32, rf64, rf128, rf256},
        mcch2-Offset                   INTEGER(0..10),
        mcch2-ModificationPeriod       ENUMERATED {rf1, rf2, rf4, rf8, rf16, rf32, rf64, rf128, rf256, rf512, rf1024},
        Sf-AllocInfo                   BIT STRING(SIZE(6)),
        signallingMCS                  ENUMERATED {n2, n7, n13, n19}
    },
    ]]
}
-- ASN1STOP
```

According to an example, the following configuration options can be realized:
- Configure a relatively small MCCH periodicity, and in this case no repetition is used for the MCCH transmission
- Configure MCCH periodicity and MCCH repetition for the MCCH transmission
- MCCH periodicity can take any value from 1-10 ms to 10.12 s depending on the application
- Second (or further) MCCH is configured independently from first MCCH configuration
- MCCH change notification is not provided for the second, third, . . . MCCHs The first MCCH can be used in connection with transmission of a first type of service, such as a TV service for example. An additional MCCH can be used in connection with transmission for another service, such as a public safety service for example. Typically, MCCH can only be modified at the MCCH modification boundary, which is currently set to 5.12 s or 10.2 sec. These values are not tolerable for group communication in emergency public safety communications. Therefore, to avoid the delay from MCCH modification for public safety but at the same time avoid any impacts on legacy UEs that may be using eMBMS for other applications, such as mobile TV for example, at least one additional MCCH is provided with a modification period that is defined to have a value that is lower than the legacy case, such as a value within the range 1 ms to 5.12 s or 10.2 s for example.

In terms of informing the MCCH changes to the UE for the second, third, and so on MCCH that has been configured with a relatively small (compared to the legacy MCCH) periodicity, the UE procedure is modified such that the UE is required to monitor MCCH at the MCCH modification boundary in an example.

If an MCCH change notification is seen essential requirement for second, third MCCHs for example to achieve the UE power saving, a new MCCH change notification, which is independent of first MCCH is required.

In order to reduce the amount of signalling bits required for transmission of an additional MCCH configuration, a delta information transmission compared to the first MCCH configuration can be provided. That is, only parameter values which are different from the first (legacy) MCCH are transmitted for any additional MCCH. Thus a UE decoding both first and the second (or further) MCCH configuration data can realise the full configuration for the second (and so on) MCCH.

If the physical resources used for transmission on MTCHs collide, the radio waveform will be corrupted and any receiving UEs will therefore not be able to receive data correctly. This is therefore a waste of radio resources.

Figure 2:
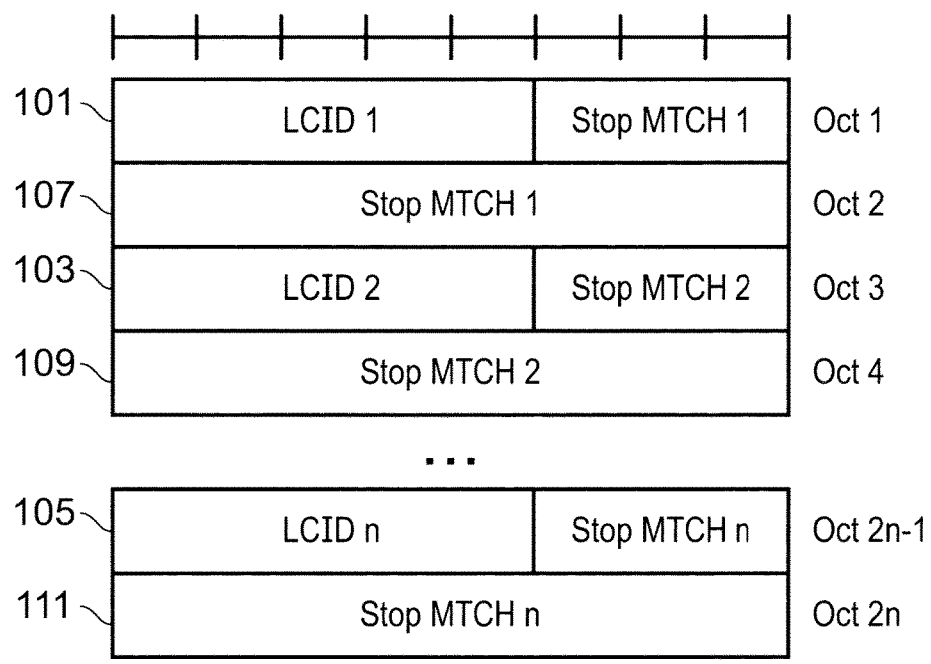
FIG. 2 is a schematic representation of the format used for MCH scheduling information MAC control element according to an example.

According to an example, the avoidance of physical resource collision can be avoided in two ways. Note that the radio resource for MTCH transmission is scheduled via the MCH scheduling information MAC CE, which is a MAC command transmitted at the beginning of the MCH scheduling period. The physical resource scheduled for a particular MTCH is informed with the indication of the start subframe and end subframe. FIG. 2 is a schematic representation of the format used for MCH scheduling information MAC control element.

LCID is the logical channel ID of the MTCH. The length of the field is 5 bits. In the example of FIG. 2, multiple LCIDs are depicted (LCID1 (101), LCID2 (103) . . . LCIDn (105)). The stop MTCH field (107, 109, 111) indicates the ordinal number of the subframe within the MCH scheduling period, counting only the subframes allocated to the MCH, where the corresponding MTCH stops. Value 0 corresponds to the first subframe. The length of the field is 11 bits. The special Stop MTCH value 2047 indicates that the corresponding MTCH is not scheduled. The value range 2043 to 2046 is reserved.

In an example, radio resource collision can be avoided via scheduling within a subframe. More specifically, the resources that are to be used for particular MTCH are coordinated among eNBs involved in the eMBMS transmission. The data scheduled via two or more MCCHs are taken into account in the resource coordination in such a way to avoid any resource collision. This approach provides a finer granularity of resource allocation while avoiding resource collision. For example MTCH1 scheduled from MCCH1, and MTCH2 scheduled from MCCH2 can be transmitted in the same physical multicast channel (PMCH) in a transmission time interval (TTI). In order to inform the UEs who are only interested in receiving MTCHs scheduled from MCCH1 for example, a dummy logical channel ID (from the received logical channel ID space) can be used to inform the UEs in question to free up of resources for the use of other MTCHs. Legacy UEs can ignore the use of dummy logical channel IDs.

Figure 3:
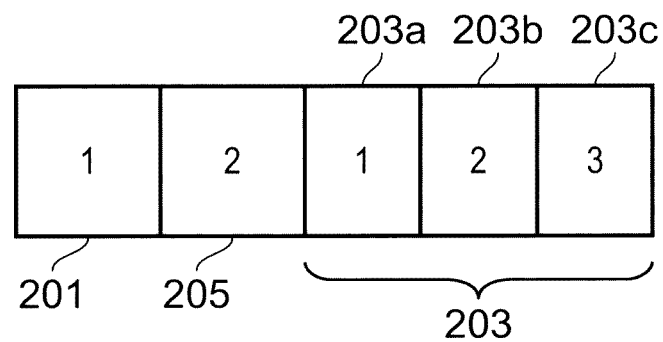
FIG. 3 is a schematic representation of radio resource allocation according to an example.

FIG. 3 is a schematic representation of radio resource allocation for MTCH1 and MTCH2 scheduled to be transmitted on the same subframe (i.e. TTI) according to an example.

MCCH1 is signalled in a subframe 1 (201) and indicates that, for example, MTCH1, MTCH3, MTCH5 belong to an MCCH1. Additionally, MCCH1 indicates subframes1,2, and 3 (203) are used for the scheduling of MTCHs belonging to MCCH1.

MCCH2 is signalled in subframe 2 (205) and indicates that MTCH2, MTCH4 and MTCH6, for example, belong to MCCH2. Further MCCH2 indicates that subframes 1,2 and 3 (203) are used for scheduling of MTChs belonging to MCCH2. In this example subframs 1,2 and 3 (203) are used to schedule MTCH1 MTCH6. MTCH1 is mapped to LCID1, MTCH2 mapped to LCID2 and so on. LCID0 is used as the dummy Logical channel.

Figure 4:
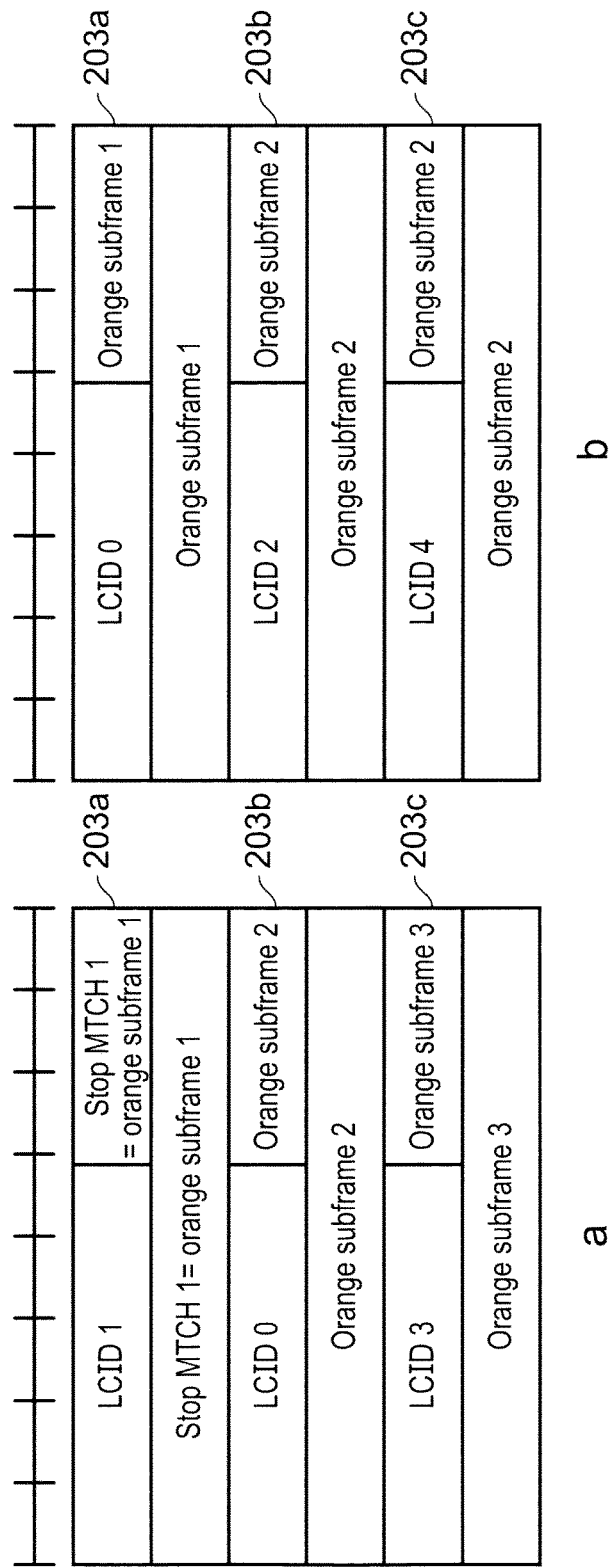
FIG. 4a is a schematic representation of signalling according to an example.
FIG. 4b is a schematic representation of signalling according to an example.

FIG. 4a is a schematic representation of signalling in respect of MSI MAC CE for the MTCHs belonging to MCCH1.

FIG. 4b is a schematic representation of signalling in respect of MSI MAC CE for the MTCHs belonging to MCCH2.

In the example, the UE interested in MTCH1 stores the data received on subframe 1 (201). The UEs listening to the MTCHs of MCCH2 do not store the data on subframe 1 (201) as it is indicated for the dummy LCID. Therefore resource collision between the MTCH of MCCH1 and MCCH2 is avoided.

This approach can be generalized to MCH resource sharing for scheduling of MTCHs from two or more MCCHs. MCCHs can be belong to the same MBSFN area or different MBSFN areas. This approach provides efficient use of radio resources.

Figure 5:
FIG. 5 is a schematic representation of radio resource allocation according to an example.
Figure 5:
Figure 5:
Figure 5:
Figure 5:

In an example, radio resource partitioned at subframe levels can be used for MTCHs scheduled from a first MCCH and a second MCCH. A possible realisation of MTCHs scheduled from a first MCCH and a second MCCH is described below. It is assumed that MTCH1, MTCH2, and MTCH3 belong to MCCH1 while MTCH4, MTCH5 and MTCH6 belong to MCCH2. The subframe allocated for transmission of the MTCH belonging to MCCH1 and MCCH2 do not overlap as shown in FIG. 5, which is a schematic representation of radio resource allocation according to an example. Therefore, the resources used for MTCH1,MTCH2 and MTCH3 transmission do not collide with that of MTCH4, MTCH5 and MTCH6.

However, the subframe level resource allocation for MTCHs belong to MCCH1 and MCCH2 has a limitation in terms of the efficiency of radio resource due to the fact that MTCHs from two MCCHs cannot be transmitted on the same subframe. However, this approach provides a simple configuration mechanism from a network point of view.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method for providing communication services to multiple user equipment devices across multiple cells of a wireless telecommunication system and supporting broadcast information services in one or more multimedia-broadcast multicast-service single frequency network (MBSFN) areas of the system, the method comprising:
   providing a first point-to-multipoint multicast control channel (MCCH) and at least one additional MCCH per MBSFN area; and
   configuring a modification period of the at least one additional MCCH in an MBSFN area to a lower value than a modification period of the first MCCH for the area.

2. A method as claimed in claim 1, further comprising, for an MBSFN area, selecting a periodicity for the at least one additional MCCH that is different than the periodicity of the first MCCH of the MBSFN area.

3. A method as claimed in claim 2, wherein the at least one additional MCCH is configured independently of the first MCCH channel for an area.

4. A method as claimed in claim 1, further comprising transmitting multiple multicast traffic channels (MTCHs) belonging to different MCCHs in the same physical multicast channel (PMCH) in a transmission time interval (TTI).

5. A method as claimed in claim 1, further comprising partitioning radio resource at the subframe level for the scheduling of MTCHs belonging to different MCCHs.

6. A method as claimed in claim 1, wherein the first MCCH is an unmodified control channel for the system.

7. A method as claimed in claim 1, wherein the first MCCH is used in connection with transmission of a first type of service, and the at least one additional MCCH is used in connection with transmission for a public safety service.

8. A computer program product, comprising a non-transitory computer usable medium having computer readable program code embodied therein, said computer readable program code adapted to be executed to implement a method, in a wireless telecommunication system, as claimed in claim 1.

9. A method for supporting point-to-multipoint multicast communication with multiple user equipment devices in a wireless telecommunication system, the method comprising:
   providing a first multicast control channel (MCCH) for use with the multiple UEs with a first modification period; and
   providing a second MCCH for use with at least a subset of the multiple UEs;
   wherein the second MCCH has a second modification period that is smaller than the first modification period.

10. A user equipment comprising:
   at least one processor;
   and at least one memory including computer program code;
   the at least one memory and the computer program code configured to, with the at least one processor, cause the user equipment at least to:
   periodically monitor a first multicast control channel (MCCH) of a multicast-service single frequency network (MBSFN) area in a wireless telecommunications system periodically according to a first period, the first MCCH having a first modification period; and
   periodically monitor a second MCCH of the system according to a second period, the second MCCH having a second modification period which is lower in value than the modification period of the first MCCH.

11. A wireless telecommunication system operable to provide communication services to multiple user equipment devices across multiple cells of the system and to support broadcast information services in one or more multimedia-broadcast multicast-service single frequency network (MBSFN) areas of the system, the system including a node operable to communicate with user equipment using a first point-to-multipoint multicast control channel (MCCH) and at least one additional MCCH per MBSFN area, a modification period of the at least one additional MCCH in an MBSFN area having a lower value than a modification period of the first MCCH for the area.

12. A node in a wireless telecommunication system comprising:
   at least one processor; and
   at least one memory including computer program code;
   the at least one memory and the computer program code configured to, with the at least one processor, cause the node at least to:
   provide communication services to multiple user equipment devices across multiple cells of the system and to support broadcast information services in one or more multimedia-broadcast multicast-service single frequency network (MBSFN) areas of the system, the node operable to communicate with user equipment using a first point-to-multipoint multicast control channel (MCCH) and at least one additional MCCH per MBSFN area, a modification period of the at least one additional MCCH in an MBSFN area having a lower value than a modification period of the first MCCH for the area.

13. A node as claimed in claim 12, wherein said at least one processor is configured to execute said computer-readable instructions to cause said node to configure a periodicity for the at least one additional MCCH that is different than the periodicity of the first MCCH of the MBSFN area.

* * * * *